March 25, 1969     H. SCHMID     3,435,196

PULSE-WIDTH FUNCTION GENERATOR

Filed Dec. 31, 1964     Sheet _1_ of 2

(b) INPUT X (a) RATE $f'(t) \sim \cos t$ (c) OUTPUT OF INTEGRATOR $\sim \sin X$ (d) OUTPUT $t_{f(x)} \sim \sin x$ United States Patent Office 3,435,196
Patented Mar. 25, 1969

3,435,196
PULSE-WIDTH FUNCTION GENERATOR
Hermann Schmid, Binghampton, N.Y., assignor to General Electric Company, a corporation of New York
Filed Dec. 31, 1964, Ser. No. 422,728
Int. Cl. G06f 3/00
U.S. Cl. 235—197                                  6 Claims

ABSTRACT OF THE DISCLOSURE

A function generator which utilizes a clock driven master binary counter to generate a desired function and an integrating counter to store the function. A rate signal proportional to the time derivative of the desired function is generated by a programmed selection of the parallel binary counter signals. Each pulse-width period is segmented by sensing the significant bits accumulated by the master counter in response to constant frequency clock pulses. For each segment, a logic network selects the desired pulse rate. The derivative of the function is thereby generated and an integrating counter accumulates the function under switching control of a synchronized input pulse having a pulse-width proportional to the variable of the function. By subsequently counting down the integrating counter with the clock pulses, a pulse-width signal is generated proportional to the desired function.

---

This invention is directed to a general purpose function generator for generating functions, such as trigonometric functions, which is characterized by utilizing digital components and accepting pulse-width signals as inputs. Output signals are made readily available in both pulse-width and digital forms.

In many computers and control systems, it has been found desirable to combine analog and digital components in order to obtain some of the benefits of each. In the hybrid systems of primary concern here, the basic signal form is a pulse-width signal which is repeated in successive operating cycles. In each cycle, a signal, normally in the form of a voltage or current, is maintained at a first level for a time proportional to the variable being represented, followed by reversion of the signal to a second level. This is basically an analog form of data, the pulse-width signal being capable of having a truly continuous set of values. However, when the pulse-width signals are controlled by digital apparatus, the set of values permitted is limited to a finite number of discrete values. In fact, when the pulse-width signals are generated by counter control of a constant high frequency pulse source, the systems are more digital in nature than analog and are capable of providing the accuracy and reliability normally expected of digital systems. However, there are some data processing functions which are difficult to perform with digital components in pulse-width systems without uneconomical complexity. A particularly difficult area involves function generations for functions such as trigonometric and exponential functions.

Accordingly, it is an object of the invention to provide a simple function generator responsive to pulse-width signals which utilizes digital components.

It is a further object of the invention to provide a simple function generator in which the input and/or output can be in pulse-width or digital form.

It is an additional object to provide a function generator with only digital elements operating in an analog fashion with time as a computer variable.

It is an additional object to provide a function generator that is not subject to drift, gain and zero variations or component changes and power supply variations, especially when operated over a large temperature range.

It is an additional object to provide a function generator that can be built entirely with integrated circuits, thus offering extremely small size, weight and high reliability.

It is an additional object to provide a function generator which is convertible to an inverse function generator by reversing operation of at least a portion of the generator.

It is an additional object to provide a function generator where the accuracy is not limited by the quality of the components.

Briefly stated, in accordance with certain aspects of the invention, a function generator is provided which utilizes a clock driven master binary counter to generate a desired function and an integrating counter to store the function. A rate signal proportional to the time derivative of the desired function is generated by a programmed selection of the parallel binary counter signals. Each pulse-width period is segmented by sensing the significant bits accumulated by the master counter in response to constant frequency clock pulses. For each segment, a logic network selects the desired pulse rate. The derivative of the function is thereby generated and an integrating counter accumulates the function under switching control of a synchronized input pulse having a pulse-width proportional to the variable of the function. By subsequently counting down the integrating counter with the clock pulses, a pulse-width signal is generated proportional to the desired function.

The invention, together with further objects and advantages thereof, may best be understood by referring to the following description taken in conjunction with the appended drawings in which like numerals indicate like parts and in which.

Figure 2:
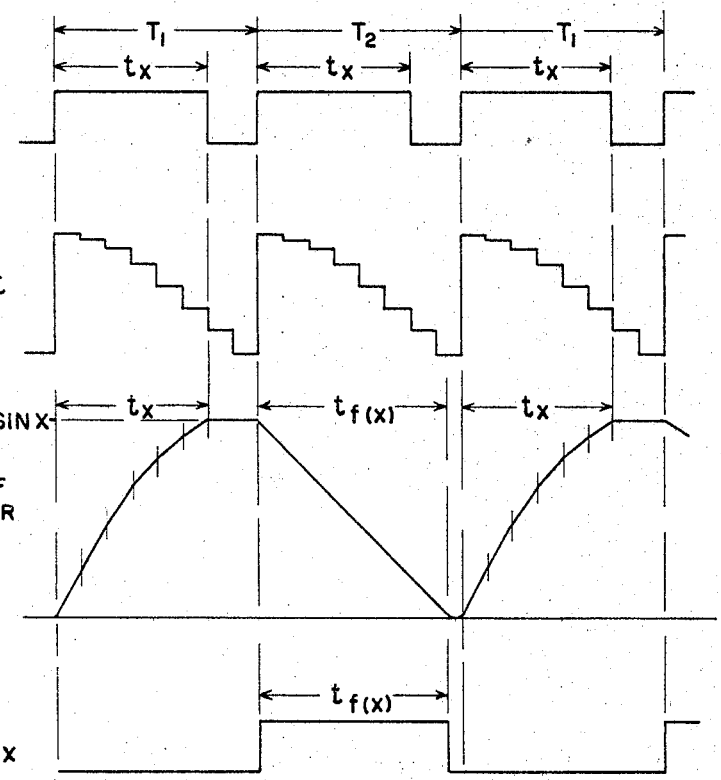
FIGURE 2 is a set of waveform diagrams illustrating the operation of the FIGURE 1 function generator.

A function generator utilizes digital components for generating the sine function from a pulse-width input signal representing the variable quantity $x$. That is, the desired output is a pulse-width signal having a time duration proportional to sin $x$. With an input variable $x$, $Kt_x=x$, where K is the system constant and $t_x$ is the duration of the input pulse-width signal. During a first operating cycle period $T_1$, a counter 11 integrates a rate signal proportional to the derivative of the desired function. That is, over a series of time segments, a digital rate signal is generated proportional to cost. The rate chosen for each segment is the straight line approximation. As shown in FIGURE 2, with only eight segments for simplified illustration, pulse signals are generated at a rate proportional to cost during each segment. The input pulse-width signal $t_x$ is applied to a switch 12 to connect the output of rate generator 13 to switch 17 so that counter 11 integrates the rate signal cost for the time $t_x$. The rate signal is generated by a rate generator 13 which receives parallel signals from a master counter 14 and binary signals representing the segment rate gating signals from wired storage 15. The rate signals are programmed by a logic network 16 which in response to the highest significant bits of master counter 14, produces gating signals in wired storage 15 for rate generator 13. Accordingly, the integrating counter 11 accumulates pulses for a pulse-width time $t_x$ in accordance with sin $t$. After switch 12 has terminated the integration at $t_x$, the counter 11 can be read out directly during the remainder of period T, or during $T_2$ to provide sin $t_x$ in parallel binary signal form, or the output signal is taken in pulse-width signal form during the following operating cycle period $T_2$, by operating switch 17, during which the counter 11 is driven down to its original zero count condition by the constant frequency clock pulses from multivibrator or oscillator 19. Upon reaching the zero count, counter 11 terminates the output pulse-width signal from a set-reset flip-flop 20.

Figure 1:
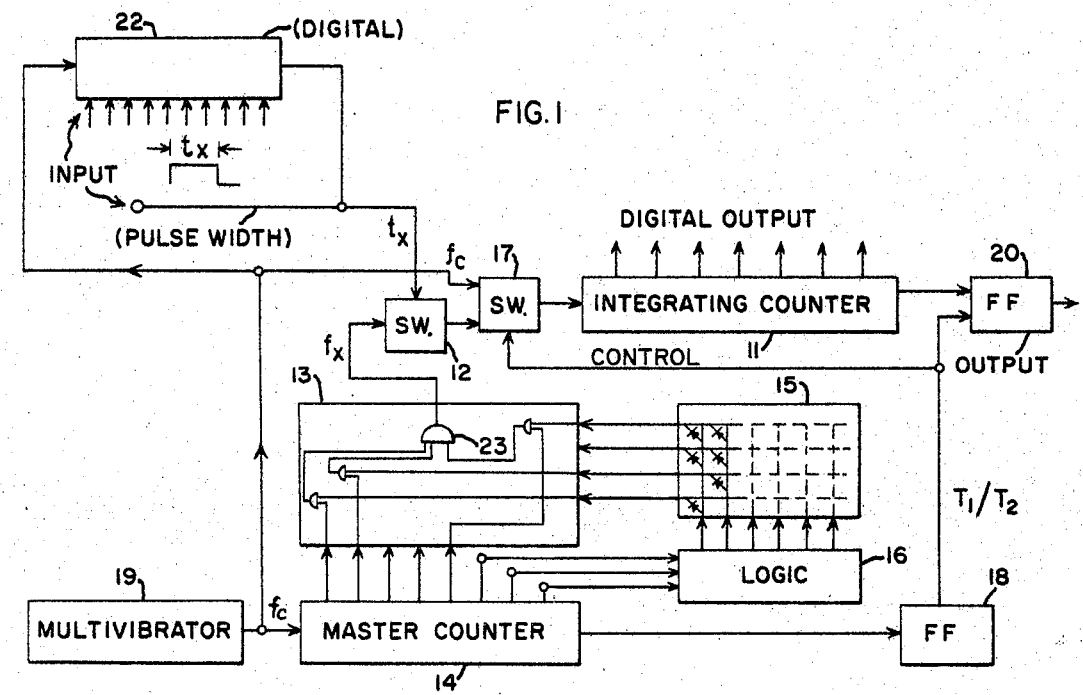
FIGURE 1 is a block diagram of a preferred embodiment of the invention for generating a function of an input variable signal.

In the FIGURE 1 function generator, the multivibrator or oscillator 19 and master counter 14 are normally basic components of the computer system which are required to generate the system clock pulses $f_c$ and the pulse-width period signals $T_1/T_2$. The master counter 14, being a binary counter, is a frequency divider, each stage dividing the input frequency $f_c$ in half. Therefore, each stage is a source of pulses at a constant rate. For example, the first stage generates pulses at a rate of $f_c/2$; and the second and third stages generate pulses at a rate $f_c/4$ and $f_c/8$, which together produce $3f_c/8$. By selection of the proper stages, a desired combined rate signal can be generated. The rate generator 13 performs this function by combining the appropriate component rate signals with a NOR gate 23. The component rate signals are selected by a set of switches. Conveniently, the switches are NOR gates, each of which receives an input from a stage of master counter 14 and an input from the wire storage 15. Logic 16, in response to the highest bits in master counter 14, serially activates segment output lines in accordance with the segment corresponding to the count, as represented by the significant input bits. The number $n$ of segments that can be generated is a function of the number $k$ of most significant bits connected to logic 16 according to: $n=2^k$. Accordingly, during each operating cycle period $T_1$, logic 16 activates the output lines serially, each of which is selectively connected, in parallel, to a number of multiplier switches in rate generator 13 by the wired storage 15. The output of rate generator 13 during a pulse period $T_1$ is a sum of products of segment time and the selected rate signals for these segments. This product signal is gated by the switch 12 for a variable time duration in accordance with the variable $t_x$. After $t_x$, with the switch 12 reopened, counter 11 provides the desired function $f(t_x)$ in digital form directly. Also, during the following pulse period $T_2$, flip-flop 18 couples the clock pulses $f_c$ from multivibrator or oscillator 19 to count down counter 11 by operating switch 17 and generate the pulse-width output by means of flip-flop 20. Input counter 22 is a means of converting binary input signals into pulse width input signals $t_x$.

By interchanging the connections so that the input signal switch 17 connects the clock pulses $f_c$ to counter 11 during the input pulse-width signal proportional to sin $x$, and the pulses from the rate generator 13 to counter 11 during $T_2$, the device becomes an inverse function generator producing a pulse-width signal proportional to the variable $x$. Interchange of connections can be accomplished by inclusion of any type of double pole, double throw reversing switch into switch 17 as a first stage in addition to the single pole double throw activated by flip-flop 18 or by the use of multiple position switches, all within the present state of the switching art.

Connecting a function of time, $g(t)$ to the input of an integrator results in an output signal, $f(t)$ which is also a function of time and which is related to the input by the following equation:

$$f(t) = \int g(t) dt \quad (1)$$

Alternatively, the input signal can be expressed in terms of the output signal as:

$$g(t) = \frac{d[f(t)]}{dt} = f'(t) \quad (2)$$

Therefore, to obtain a certain function at the output of the integrator, it is necessary that the input to the integrator bet the derivative of the desired function.

Conversion from $f(t)$ to $f(x)$ can be accomplished simply by limiting the time of integration to a value proportional to $x$, since:

$$\int_0^x f'(t)dt = f(x) - f(0) \quad (3)$$

Solving Equation 3 for $f(x)$ gives the desired result:

$$f(x) = \int_0^x f'(t)dt + f(0) \quad (4)$$

$f(0)$ defines the initial condition, which is a constant for each specific function in many cases $f(0)$ will be zero.

For certain functions, it is easier to generate $f'(t)$ than $f(t)$. This is especially valid for linear segment function generation, where the slope of the curve is constant within each segment. This means that the input to the integrator must have constant magnitude during each segment. Changes in slope can be effected by changes in the magnitude. To produce a linear segment curve, the integrator input signal must look like a staircase when plotted as a function of time. Such staircase waveforms are relatively easy to generate.

With the sine function, the initial value of the function is zero. Where the initial value of the function is non-zero, the integrating counter is preset to the initial value at the beginning of the operating cycle. This is conveniently performed by storing the initial value in wired storage 15 in the same manner as the segmet rate values are stored and applying this initial value to integrating counter 11. Similarly, with a function having negative slope segments, the binary rate generator 13 output is coupled to integrating counter 11 in a down counting mode under control of slope polarity bits in wired storage 15. Also, where the function has some negative values, by sensing the number of integrator zero-crossings, even or odd respectively, the polarity of the function for the input signal is determined.

In the function generator described, pulses are generated at precisely controlled rates. However, the pulses are not, in general, equally spaced. It is apparent, however, that the spacings do not affect the accuracy. In a manner analogous to the way the basic cyclic pulse-width system selects an upper limit on the values of variables represented and provides a time ratio relative to this limit for each variable value, the function generator provides a set of segments, each of which has a limit value, and the final result is that a fraction of the limit is selected by a precise binary division of the limit. However, the function generator is not necessarily restricted to the clock frequency of the overall pulse-width system. If greater resolution is required, substantially higher clock frequencies can be employed, preferably by augmenting the regular clock driven binary master counter 14 with cascaded frequency doublers responsive to the regular clock pulses so as to provide, in effect, higher frequency binary rate sources.

While the function generator can be implemented with standard digital components utilizing discrete components to perform the common functions, such as counting and logic gating, reliability, etc., it can be improved with integrated circuits. When so implemented, it is readily seen that the adaption of the function generator to receive the input variable in digital signal form, as shown in FIGURE 1, requires only a simple addition of a counter 22. Component quality requiremnets for the analog portions of the function generator, receiving pulse-width signals as inputs and generating pulse-width output signals, are reduced to those characteristics which insure proper switching. Reliance on analog component characteristics such as constant gain and low drift is obviated.

Figure 3:
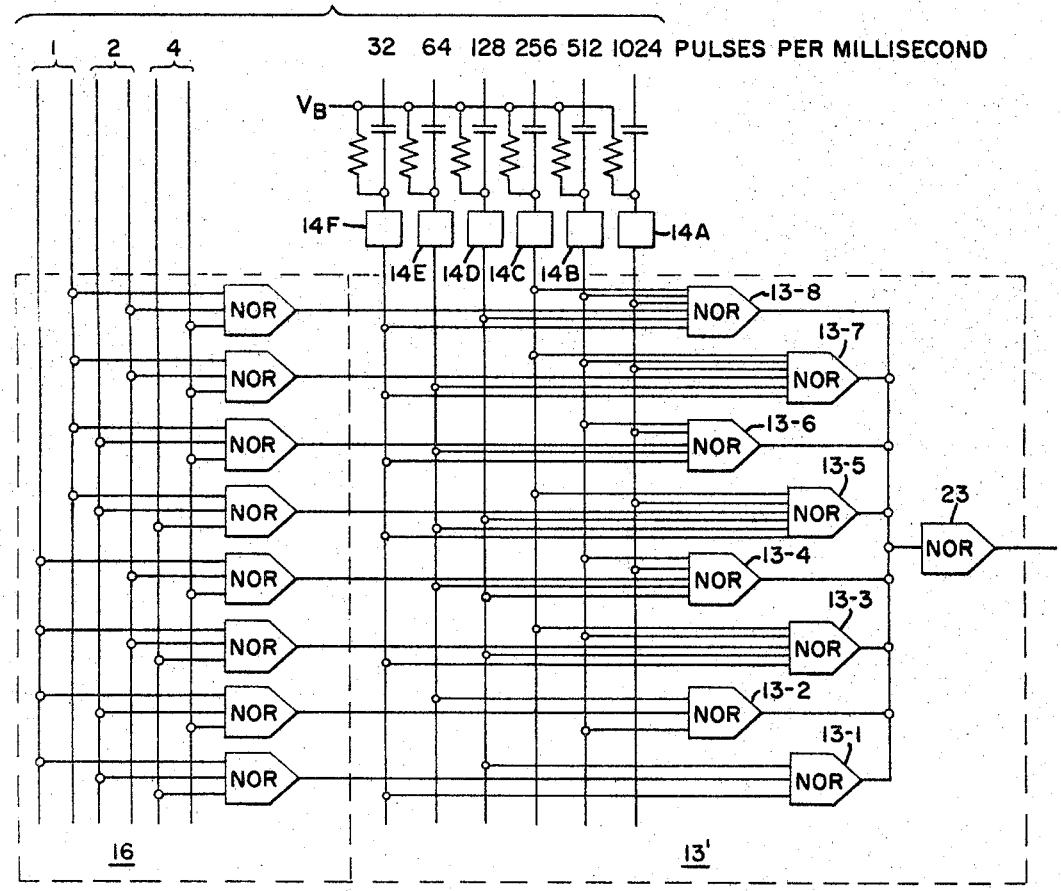
FIGURE 3 illustrates the logic connections for an eight segment embodiment illustrating the function generator in a simplified form wherein the functions of the rate generator and storage elements of the device of FIGURE 1 is performed by a single multipurpose component.

A simplified form of the invention combines segment rate selection and binary rate generation. The connections for the logic, wired storage and multiplier are shown in FIGURE 3 for the illustrative example of eight segments. The function of logic 16 is analogous to a stepping switch. It responds to timing signals representing the segments of the operating cycle in order to select a set of binary signals representing the appropriate rate for that segment. While the logic 16 function can be performed by a ring counter or a slow shift register responsive to a signal representing a termination of each segment to cyclically select the desired segment rate, it is preferable to select the segment lines on the basis of the condition of master counter 14, which is the ultimate reference for the operating cycles of which the segments are parts. The function of the wired storage which in this configuration is combined with the rate generator into 13' is simply a digital "read only" memory and can therefore be performed by any apparatus responsive to the segment selection signals to generate the digital signal representing the desired rate. While it is preferable to use a simple fixed program controlled by segment selection, any of the many digital techniques for storing numbers may be employed. The wired storage is a simple read only memory matrix in which a set of input segment terminals are selectively wired to gate a set of rate signals in the rate generator 13'. The resulting parallel signals are combined and inverted by NOR gate 23. For the illustrative eight segment sine function example, the mathematical relationships are given by the following table:

FREQUENCY SELECTION FOR SINE FUNCTION GENERATOR WITH EIGHT SEGMENTS FOR 90 DEGREES

| Segment | $\theta_i$ | Sin $\theta_i$ | Δ Sin | $t_i$ | A 1024 | B 512 | C 256 | D 128 | E 64 | F 32 | Pulses per segment |
|---|---|---|---|---|---|---|---|---|---|---|---|
| 1 | 5.625 / 11.250 | 0.098 / 0.195 | 0.195 | 1,952 | 1 | 1 | 1 | 1 |  | 1 | 244 |
| 2 | 16.875 / 22.500 | 0.290 / 0.383 | 0.188 | 1,888 | 1 | 1 | 1 |  | 1 | 1 | 234 |
| 3 | 28.125 / 33.750 | 0.471 / 0.555 | 0.173 | 1,728 | 1 | 1 |  | 1 | 1 |  | 216 |
| 4 | 39.375 / 45.000 | 0.634 / 0.707 | 0.152 | 1,504 | 1 |  | 1 | 1 | 1 | 1 | 192 |
| 5 | 50.625 / 56.250 | 0.773 / 0.831 | 0.124 | 1,248 | 1 |  |  | 1 | 1 | 1 | 156 |
| 6 | 61.875 / 67.500 | 0.882 / 0.924 | 0.092 | 928 |  | 1 | 1 | 1 |  | 1 | 116 |
| 7 | 73.125 / 78.750 | 0.957 / 0.987 | 0.057 | 576 |  | 1 |  |  | 1 |  | 72 |
| 8 | 84.375 / 90.000 | 0.995 / 1.000 | 0.019 | 196 |  |  |  | 1 | 1 |  | 24 |
| Total pulses |  |  |  |  |  |  |  |  |  |  | 1,254 |

While particular embodiments of the invention have been shown and described herein, it is not intended that the invention be limited to such disclosure, but that changes and modifications can be made and incorporated within the scope of the claims.

What is claimed is:

1. A function generator for providing pulse-width modulated signals comprising:
    (a) a digital rate generator, responsive to a plurality of constant frequency pulses and to segment control signals, for generating pulses at a rate proportional to the time derivative of the desired function;
    (b) logic and storage means, providing said segment control signals as a function of the pulse frequency, coupled to said digital rate generator;
    (c) an integrator, coupled to receive the pulses from said rate generator;
    (d) input switching means for connecting said digital rate generator to said integrator during an input pulse-width signal to cause said integrator to accumulate from said rate generator a digital count representative of said desired function;
    (e) readout switching means for subsequently connecting a constant pulse rate reference signal to said integrator for discharge thereof at said pulse rate to determine the time duration of a pulse-width signal proportional to said desired function.

2. The function generator of claim 1 further comprising:
    (f) an input counter attached to said input switching means and being responsive to the same constant frequency pulses, for receiving digital input variable signals and generating proportional input pulse-width signals, whereby input can be received in digital form.

3. A function generator for pulse-width signals comprising:
    (a) a master counter responsive to constant frequency pulses for generation of a plurality of pulsed signals having binary relationship to said constant frequency pulses;
    (b) a logic network responsive to said master counter for providing segment rate selection signals;
    (c) a rate generator responsive to said master counter and to said segment rate selective signals for generating a train of pulses representing the derivative of the desired function over respective segments of the function variable values;
    (d) an integrating counter for integrating said train of pulses;
    (e) switching means, responsive to an input pulse-width signal, interconnecting said rate generator and said integrating counter for controlling the time during which the said train of pulses are applied to said integrating counter.

4. The function generator of claim 3 further comprising:
    (f) additional switching means, responsive to signals representing the termination of the operating cycle, interconnecting said integrating counter and said master counter for applying said constant frequency pulses to said integrating counter so as to determine the time for generation of a pulse-width output signal proportional to the accumulated count representing the desired function;

5. A function generator comprising:
    (a) a source of constant frequency clock pulses;
    (b) a master binary counter responsive to constant frequency pulses produced by said source for generating, in parallel, a set of constant rate pulse signals which have a binary multiple relationship;
    (c) a logic network responsive to the highest order binary stages of said binary counter for producing parallel binary signals to provide segment selection, the number $k$ of highest order binary stages being related to the number $n$ of segments desired by the ratio or $n=2^k$;
    (d) a programmed digital memory responsive to said parallel binary signals for generating signals representing the desired segment rate;
    (e) a rate generator responsive to respective stages of said binary counter and said memory for generating a train of pulses representing the derivative of the desired function;
    (f) an integrating counter connected by switching means to said rate generator for integrating said train of pulses;
    (g) said switching means including a first switch, responsive to an input pulse-width signal for controlling the time during which the train of pulses are applied to said integrating counter;

(h) said switching means also including a second switch for coupling said source of clock pulses to said integrating counter to cause said integrating counter to count down at the rate of said constant frequency clock pulses to create an output proportional to the desired function.

6. A function generator comprising:
(a) a source of constant frequency pulses;
(b) a multistage binary frequency divider responsive to constant frequency pulses from said source for producing at each stage a pulse train of different binary relationship to said constant frequency pulses;
(c) a programmed memory having a plurality of segments;
(d) a logic network responsive to the said pulse trains carrying the highest bits for serially activating said segments of the memory wherein the number of said highest bits does not exceed $k$ as defined by $n=2^k$ where $n$ is the number of said segments;
(e) a rate generator including a gate connected to each stage of said frequency divider and to each said segment of the memory for controlling said gates as said segments are activated by said logic to generate a train of pulses made up of combinations of said pulse trains produced at each stage of said frequency divider to produce a pulse rate proportional to the derivation of the function to be generated;
(f) a digital counter for integrating said train of pulses over a period of time;
(g) switching means interposed between said digital counter and said rate generator and responsive to input signals for connecting said digital counter to said rate generator for time intervals representing quantities for which functions are to be generated;
(h) means for activating said switch for a time representing a quantity for which a function is to be generated.

References Cited

UNITED STATES PATENTS

| 3,264,457 | 8/1966 | Seegmiller et al. | 235—197 |
| 3,217,148 | 11/1965 | Robinson | 235—197 |
| 2,921,740 | 1/1960 | Dobbins et al. | 235—150.53 |

MALCOLM A. MORRISON, *Primary Examiner.*

F. D. GRUBER, *Assistant Examiner.*

U.S. Cl. X.R.

235—150.52, 150.53, 183, 194; 340—347